(12) United States Patent
Chuang et al.

(10) Patent No.: US 7,638,185 B2
(45) Date of Patent: Dec. 29, 2009

(54) OPTICAL FILM HAVING HIGH HARDNESS AND USE THEREOF

(75) Inventors: Shih-Yi Chuang, Kaohsiung (TW); Tu-Yi Wu, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 0 days.

(21) Appl. No.: 11/215,807

(22) Filed: Aug. 30, 2005

(65) Prior Publication Data

US 2006/0077322 A1    Apr. 13, 2006

(30) Foreign Application Priority Data

Sep. 3, 2004    (TW) .............................. 93126712 A

(51) Int. Cl.
| | |
|---|---|
| *B32B 27/32* | (2006.01) |
| *B32B 5/16* | (2006.01) |
| *B32B 27/36* | (2006.01) |
| *B32B 27/38* | (2006.01) |
| *B32B 27/40* | (2006.01) |
| *B32B 27/00* | (2006.01) |

(52) U.S. Cl. .................. 428/220; 428/323; 428/328; 428/329; 428/331; 428/332; 428/412; 428/413; 428/423.1; 428/473.5; 428/500

(58) Field of Classification Search ............... None
See application file for complete search history.

(56) References Cited

U.S. PATENT DOCUMENTS

| | | | |
|---|---|---|---|
| 4,569,869 A * | 2/1986 | Kushida et al. ............. 428/35.7 |
| 4,791,540 A | 12/1988 | Dreyer, Jr. et al. | |
| 5,378,735 A | 1/1995 | Hosokawa et al. | |
| 5,712,325 A | 1/1998 | Lewis et al. | |
| 5,760,126 A | 6/1998 | Engle et al. | |
| 5,828,488 A | 10/1998 | Ouderkirk et al. | |
| 5,968,871 A | 10/1999 | Katashima et al. | |
| 6,042,945 A | 3/2000 | Mackawa | |
| 6,160,067 A | 12/2000 | Eriyama et al. | |
| 6,214,467 B1 | 4/2001 | Edwards et al. | |
| 6,355,703 B1 | 3/2002 | Baba et al. | |
| 2003/0100693 A1 | 5/2003 | Olson et al. | |
| 2004/0233526 A1 * | 11/2004 | Kaminsky et al. ........... 359/452 |

FOREIGN PATENT DOCUMENTS

JP    2-272041    11/1990

OTHER PUBLICATIONS

English abstract of JP 2-272041 dated Nov. 6, 1990.

* cited by examiner

*Primary Examiner*—Sheeba Ahmed
(74) *Attorney, Agent, or Firm*—Ladas and Parry LLP

(57) ABSTRACT

The invention pertains to an optical film comprising a transparent substrate and at least one coating coated on the surface of the substrate. The coating comprises a polymeric matrix and inorganic nano particles dispersed therein. The inventive optical film possesses a light-focusing structure.

The present invention further provides a method for enhancing the brightness of the panel boards of liquid crystal displays.

23 Claims, 1 Drawing Sheet

OPTICAL FILM HAVING HIGH HARDNESS AND USE THEREOF

FIELD OF THE INVENTION

The invention relates to an optical film. The inventive optical film possesses a light-focusing structure, which may be used as a light-focusing film of the backlight source in a liquid crystal display.

BACKGROUND OF THE INVENTION

In recent years, traditional cathode ray tube (CRT) displays have been gradually replaced by liquid crystal displays (LCD), which are light-weighted, thin, short and small in size and almost radiation free, and have low heat and power consumption.

In general, the primary structure of a LCD includes a panel board and a backlight module. The panel board includes, for example, indium tin oxide (ITO) conductive glass, liquid crystals, an alignment film, a color filter, a polarizer and a drive integrated circuit. The backlight module includes lighting tubes, a light guide and various optical films. The entire optical performance of a LCD is interactively influenced by all the elements of the backlight module, among which the optical films play an important role in brightness, evenness, contrast and viewing angle of the screen.

Various attempts have been made in the industry to improve the viewing angle and color of LCDs. For example, it is known that the brightness of a LCD panel board may be enhanced by increasing the numbers of lighting tubes, which, however, not only tends to cumulate excessive heat in the LCD and will influence the lifetime and quality of other elements, but also consumes a large amount of electricity, and thus fails to meet the requirement that many IT products have to depend on batteries for off-line applications.

Currently, the most economic and convenient means has been using various optical films in the backlight module to enhance the brightness of the panel board of a LCD so as to maximize the efficiency of the light source without any change in element designs or consumption of additional energy.

"Brightness enhancement film" is commonly abbreviated as "BEF" or referred to as "light-focusing film," which may be made, for example, by curing a special acrylic resin into a micro-prism structure with high energy ultraviolet radiation (UV) on a polyester optical film having a thickness of 125 µm only. The major function of the brightness enhancement film is to collect the dispersive lights emitted towards all the directions from the light guide by refraction and total internal reflection, and to focus the lights in the on-axis direction of about ±35 degrees, so as to enhance the brightness of the LCD.

There have been published patent documents disclosing the employment of light-focusing films in backlight modules. For example, U.S. Pat. No. 4,791,540 granted to 3M Corp. discloses using a backlight module comprising more than two perpendicular overlapping light-focusing films to effectively enhance the brightness. In addition, U.S. Pat. No. 5,828,488 discloses using a backlight module comprising a diffusion film and a light-focusing film to effectively enhance the brightness of the LCD panel board.

Common light-focusing films are known to have prism peaks. If the prism peaks do not have sufficient hardness, collapse will take place, which will result in dark spots on the appearance of the LCD panel board. Moreover, such prism peaks are normally vulnerable, and thus prone to be scratched during assembly or transportation. Therefore, how to increase the hardness of the prism peaks of a light-focusing film has become an important research project in the industry.

This invention provides a solution for the project.

SUMMARY OF THE INVENTION

The primary object of the invention is to provide an optical film comprising a transparent substrate and at least one coating coated on the surface of the substrate. The coating comprises a polymeric matrix and inorganic nano particles dispersed therein. The optical film possesses a light-focusing structure.

The present invention also provides a method for enhancing the brightness of the panel boards of LCDs.

DETAILED DESCRIPTION OF THE INVENTION

Figure 1:
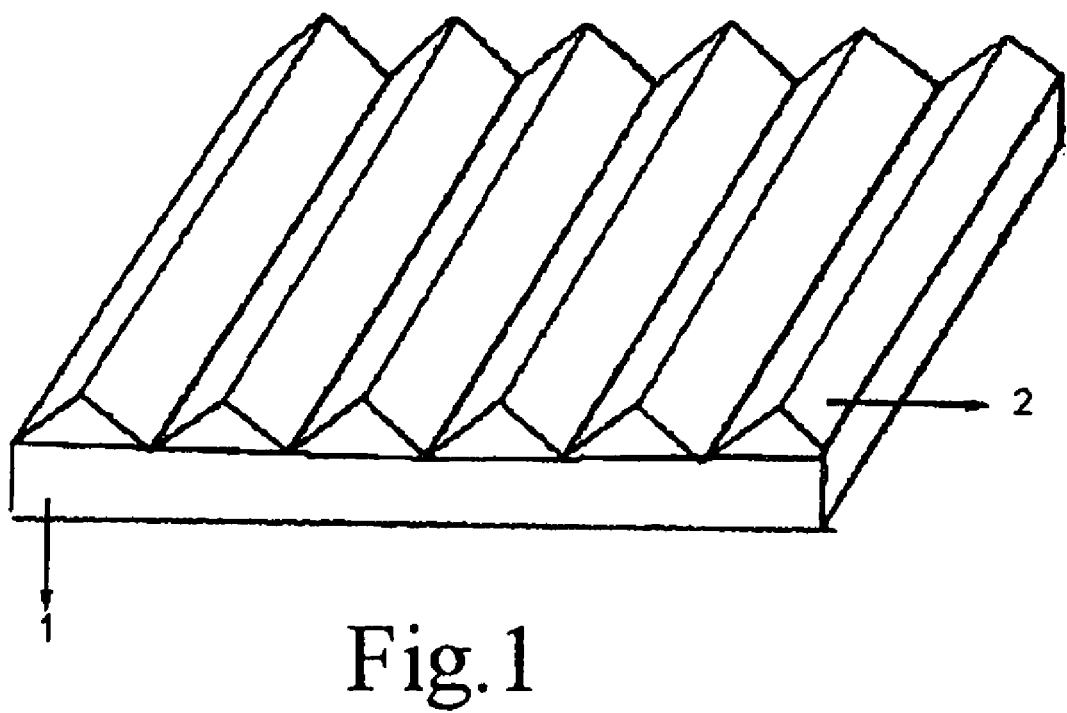
FIG. 1 shows an optical film according to the present invention.

As shown in FIG. 1, the inventive optical film comprises a transparent substrate 1 and at least one coating 2 coated on the surface of the substrate. The coating comprises a polymeric matrix and inorganic nano particles dispersed therein. The inventive optical film possesses a light-focusing structure.

The substrate used in the inventive optical film may be any form known to those skilled in the art, such as glass or plastic. There is no specific limitation on the material of said plastic substrate, which includes, but not limited to, polyester resin, such as polyethylene terephthalate (PET); polyacrylate resin, such as polymethyl methacrylate (PMMA); polyolefin resin, such as polyethylene (PE) or polypropylene (PP); polyimide resin; polycarbonate resin; polyurethane resin; triacetate cellulose (TAC) or mixtures thereof.

The plastic substrate for the optical film of the present invention is preferably a substrate of polyester resin, polycarbonate resin or mixtures thereof, more preferably a substrate of polyethylene terephthalate.

The polymeric matrix contained in the coating of the inventive optical film may be obtained by polymerizing any polymeric monomers suitable for manufacturing optical films that are known to those skilled in the art. Examples of suitable polymeric monomers include, for example, epoxy diacrylate, halogenated epoxy diacrylate, methyl methacrylate, isobornyl acrylate, 2-phenoxy ethyl acrylate, acrylamide, styrene, halogenated styrene, acrylic acid, acrylonitrile, methacrylonitrile, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane oligomer or mixtures thereof. Preferred polymeric monomers include halogenated epoxy diacrylate, methyl methacrylate, 2-phenoxy ethyl acrylate, aliphatic urethane diacrylate, aliphatic urethane hexaacrylate, and aromatic urethane hexaacrylate.

There is no specific limitation on the species of the inorganic particles used in the invention. Examples include, but not limited to, $TiO_2$, $SiO_2$, $ZnO$, $BaSO_4$, $CaCO_3$, $ZrO_2$ or mixtures thereof. Preferably, the inorganic particles are $SiO_2$ particles. The inorganic particles have a particle size of nanoscale, typically in the range from 1 to 100 nm. Preferably, the inorganic particles used in the invention have a particle size between 10 and 60 nm.

The coating of the inventive optical film has a refractive index between 1.4 and 2.5, preferably between 1.4 and 2.0.

For the inventive optical film, the ratio of the polymeric matrix to the inorganic nano particles is not important and may depend on the final purposes desired.

The coating of the inventive optical film may optionally contain an additive known to those skilled in the art, such as leveling agent, defoamer, and antistatic agent, etc.

The coating of the inventive optical film has a thickness from 5 μm to 100 μm, preferably from 10 μm to 40 μm.

The inventive optical film may be made by any method known to those skilled in the art. For example, it may be made by a method comprising the following steps:
  (a) mixing a polymeric matrix, a photoinitiator and inorganic nano particles to form a colloidal coating composition;
  (b) coating the colloidal coating composition onto a transparent substrate to form a coating;
  (c) then forming the coating into a light-focusing structure by means of roller embossment or hot extrusion; and
  (d) exposing the coating to an energetic ray or heat or both at normal temperature to cure the coating.

Preferably, the coating curing in the above-mentioned step (d) is conducted by exposure to the energetic ray, which initiates a photo-polymerization. The energetic ray refers to a light source in a certain wavelength range, such as UV-light, infrared light, visible light, heat ray (irradiation or radiation), and the like, preferably UV-light. Exposure intensity may be in the range of from 1 to 300 mJ/cm$^2$, preferably 10 to 100 mJ/cm$^2$.

If desired, the above steps can be repeated to form a plurality of coatings on the transparent substrate.

The inventive optical film has a light-focusing structure and can be used as a light-focusing film of the backlight source in a LCD. The presence of inorganic nano particles in the film can effectively increase the hardness of the prism peaks so as to avoid collapse of the light-focusing structure, and therefore enhance the brightness of the LCD panel board.

Accordingly, the present invention further provides a method for enhancing the brightness of the panel boards of LCDs, which comprises using the aforementioned optical film as the light-focusing film of the backlight source in the LCDs to enhance the brightness of the LCD panel boards.

The invention will be further illustrated, but not be limited by the following examples. Any modification or change of the invention easily achieved by those skilled in the art is falling within the scope of the disclosures and the appended claims.

EXAMPLES

The inventive optical film was made according to the method described below. The composition of the formulation in each example was shown in Table 1.

TABLE 1

| Formulation | EM210 ® (g) | 624-100 ® (g) | 601A-35 ® (g) | Chivacure ® BP (g) |
|---|---|---|---|---|
| A | 40 | 60 | 0 | 3 |
| B | 40 | 60 | 1 | 3 |
| C | 40 | 60 | 3 | 3 |
| D | 40 | 60 | 5 | 3 |
| E | 40 | 60 | 7 | 3 |
| F | 40 | 60 | 10 | 3 |

EM210® (2-phenoxy ethyl acrylate, commercially available from Eternal Corp.) and 624-100® (epoxy acrylate, sold by Eternal Corp.) were mixed in above weight ratio and stirred with addition of photoinitiators (benzophenone, Chivacure® BP, supplied by Two Bond Chemicals) at a speed of 1000 rpm. Then SiO$_2$ (601A-35®, commercially available from Eternal Corp.) was added to the resultant mixture to form a colloidal coating composition.

The above colloidal coating composition was coated on a PET substrate (U34®, commercially available from TORAY Corp.) to give an optical film with a thickness of 25 μm after drying.

The resultant optical films were subjected to the tests on refractive index (according to the automatic refractometer GPR11-37 testing method provided by Index Instruments) and on hardness (according to the DIN53157 testing method provided by KÖNIG). The obtained results were shown in Table 2.

TABLE 2

| | Refractive index (25° C.) | Rigidity |
|---|---|---|
| A | 1.539 | 130 |
| B | 1.538 | 132 |
| C | 1.538 | 140 |
| D | 1.536 | 148 |
| E | 1.535 | 148 |
| F | 1.535 | 150 |

As shown in Table 2, the refractive indexes of the coatings with the incorporation of inorganic nano particles on the surface of the substrate were almost the same as that of the coating without the incorporation of inorganic nano particles, whereas the hardness was enhanced. Thus, the collapse of the light-focusing structure can be avoided so as to enhance the brightness of the panel boards of LCDs.

What is claimed is:

1. An optical film comprising a transparent substrate and at least one coating coated on the surface of the substrate, wherein the coating consists essentially of a polymeric matrix and inorganic nano particles and the optical film has a light-focusing structure, wherein the coating forms a plurality of prisms with each of the prisms comprising a prism peak, the inorganic nano particles being present in the coating in an amount effective to increase the hardness of the prism peaks so as to inhibit collapse of the light-focusing structure, wherein the polymeric matrix is obtained by (a) polymerizing monomers selected from the group consisting of halogenated epoxy diacrylate, methyl methacrylate, 2-phenoxy ethyl acrylate, and mixtures thereof to form a UV-light curable polymer and (b) curing the UV-light curable polymer by exposure to UV light, wherein the coating forms a plurality of prisms with each of the prisms comprising a prism peak, the inorganic nano particles being present in the coating in an amount effective to increase the hardness of the prism peaks as compared to the hardness of the prism peaks without the nano particles being present.

2. The optical film of claim 1, wherein the substrate is plastic or glass.

3. The optical film of claim 2, wherein the plastic is selected from the group consisting of polyester resin, polyacrylate resin, polyolefin resin, polyimide resin, polycarbonate resin, polyurethane resin, triacetate cellulose and mixtures thereof.

4. The optical film of claim 3, wherein the plastic is polyethylene terephthalate.

5. The optical film of claim 1, wherein the inorganic nano particles are selected from the group consisting of $TiO_2$, $SiO_2$, ZnO, $BaSO_4$, $CaCO_3$, $ZrO_2$, and mixtures thereof.

6. The optical film of claim 1, wherein the coating has a refractive index between 1.4 and 2.5.

7. The optical film of claim 6, wherein the coating has a refractive index between 1.4 and 2.0.

8. The optical film of claim 1, wherein the coating has a thickness from 5 µm to 100 µm.

9. The optical film of claim 8, wherein the coating has a thickness from 10 µm to 40 µm.

10. The optical film of claim 1, wherein the particle size of the inorganic nano particles is in the range from 1 to 100 nm.

11. The optical film of claim 10, wherein the particle size of the inorganic nano particles is in the range from 10 to 60 nm.

12. A backlight source for a panel board, the backlight source comprising a plurality of lighting tubes, a light guide and the optical film of claim 1.

13. A liquid crystal display comprising (a) a panel board having a plurality of liquid crystals and (b) a backlight source for the panel board, the backlight source comprising a plurality of lighting tubes, a light guide and the optical film of claim 1, the optical film being disposed in the backlight source for collecting light from the light guide and for focusing the light to enhance the brightness of the liquid crystal display.

14. An optical film comprising a transparent substrate and at least one coating coated on the surface of the substrate, wherein the at least one coating consists essentially of a cured polymeric matrix and inorganic nano particles and the optical film has a light-focusing structure, wherein the coating forms a plurality of prisms with each of the prisms comprising a prism peak, the inorganic nano particles being present in the coating in an amount effective to increase the hardness of the prism peaks so as to inhibit collapse of the light-focusing structure, wherein the at least one coating is obtained by (a) coating the substrate with a composition comprising a UV light curable polymer, the inorganic nano particles and a photoinitiator, the UV light curable polymer being formed by polymerizing monomers selected from the group consisting of halogenated epoxy diacrylate, methyl methacrylate, 2-phenoxy ethyl acrylate, and mixtures thereof and (b) initiating a photopolymerization of the UV-light curable polymer by exposure to UV light to cure the polymer and thereby to form the cured polymeric matrix, wherein the coating forms a plurality of prisms with each of the prisms comprising a prism peak, the inorganic nano particles being present in the coating in an amount effective to increase the hardness of the prism peaks so as to avoid a disruption of the prism peaks that would adversely affect the ability of the optical film to focus light when used in an LCD panel.

15. The optical film according to claim 14, wherein the at least one coating consists of the polymeric matrix and the inorganic nano particles.

16. The optical film according to claim 14, wherein the at least one coating consists of the polymeric matrix, the inorganic nano particles and an additive.

17. The optical film according to claim 16, wherein the additive is selected from the group consisting of a leveling agent, a defoamer and an antistatic agent.

18. The optical film according to claim 14, wherein the composition consists of the monomers, the photoinitiator and the inorganic nano particles.

19. The optical film according to claim 14, wherein the at least one coating is obtained by a process consisting of steps (a) and (b).

20. An optical film comprising a transparent substrate and at least one coating coated on the surface of the substrate, wherein the coating consists essentially of a polymeric matrix and inorganic nano particles and the optical film has a light-focusing structure, wherein the polymeric matrix is obtained by (a) polymerizing monomers selected from the group consisting of halogenated epoxy diacrylate, methyl methacrylate, 2-phenoxy ethyl acrylate, and mixtures thereof to form a UV-light curable polymer and (b) curing the UV-light curable polymer by exposure to UV light, wherein the inorganic nano particles are present in the coating such that a refractive index of the optical film with the inorganic nano particles does not differ from the refractive index of the optical film without the inorganic nano particles by more than 0.26 %.

21. The optical film of claim 20, wherein the substrate is plastic or glass.

22. The optical film of claim 20, wherein the inorganic nano particles are selected from the group consisting of $TiO_2$, $SiO_2$, ZnO, $BaSO_4$, $CaCO_3$, $ZrO_2$, and the mixtures thereof.

23. The optical film of claim 20, wherein the coating has a refractive index between 1.4 and 2.5.

* * * * *